United States Patent
Ishibashi et al.

(10) Patent No.: US 8,518,536 B2
(45) Date of Patent: Aug. 27, 2013

(54) MAGNESIUM OXIDE PARTICLE AGGREGATE AND METHOD FOR PRODUCING THE SAME

(75) Inventors: Ryuichi Ishibashi, Ako (JP); Atsuya Kawase, Ako (JP); Kaori Yamamoto, Ako (JP)

(73) Assignee: Tateho Chemical Industries Co., Ltd., Ako-Shi (Hyogo) (JP)

( * ) Notice: Subject to any disclaimer, the term of this patent is extended or adjusted under 35 U.S.C. 154(b) by 131 days.

(21) Appl. No.: 12/666,535

(22) PCT Filed: Jun. 26, 2008

(86) PCT No.: PCT/JP2008/061608
§ 371 (c)(1),
(2), (4) Date: Dec. 23, 2009

(87) PCT Pub. No.: WO2009/001883
PCT Pub. Date: Dec. 31, 2008

(65) Prior Publication Data
US 2010/0183877 A1  Jul. 22, 2010

(30) Foreign Application Priority Data
Jun. 27, 2007  (JP) ................ 2007-168698

(51) Int. Cl.
*B32B 5/16*  (2006.01)
(52) U.S. Cl.
USPC ....................... 428/402; 428/357

(58) Field of Classification Search
USPC ....................................... 428/402
See application file for complete search history.

(56) References Cited

U.S. PATENT DOCUMENTS 5,130,277 A * 7/1992 Ueda et al. .................. 501/88
6,180,258 B1 * 1/2001 Klier .......................... 428/539.5

FOREIGN PATENT DOCUMENTS

| JP | 61209911 | 9/1986 |
|---|---|---|
| JP | 8067505 | 3/1996 |
| JP | 2001302232 | 10/2001 |
| JP | 2001327849 | 11/2001 |
| JP | 2004084017 | 3/2004 |
| JP | 2002055544 | 9/2004 |
| JP | 2004345912 | 12/2004 |
| JP | 2007091525 | 4/2007 |
| JP | 2007091525 A * | 4/2007 |
| JP | 2007138198 | 6/2007 |
| JP | 2007254250 | 10/2007 |

\* cited by examiner

*Primary Examiner* — Barara Gilliam
*Assistant Examiner* — Gary Harris
(74) *Attorney, Agent, or Firm* — Lucas & Mercanti, LLP

(57) ABSTRACT

The object is to provide a high-purity magnesium oxide particle aggregate that is redispersible and can be supplied with keeping high purity, and a method for producing the same.
A magnesium oxide particle aggregate that is an aggregate of magnesium oxide particles, wherein the magnesium oxide particles have an average particle size of 1 μm or less, and comprises Si, Al, Ca, Fe, V, Cr, Mn, Ni, Zr, B and Zn as impurities in their respective amounts of 10 ppm by mass or less, wherein the total amount of the impurities is 100 ppm by mass or less.

1 Claim, 2 Drawing Sheets

MAGNESIUM OXIDE PARTICLE AGGREGATE AND METHOD FOR PRODUCING THE SAME

This application is a 371 of PCT/JP2008/061608 filed Jun. 26, 2008, which in turn claims the priority of JP 2007-168698 filed Jun. 27, 2007, the priority of both applications is hereby claimed and both applications are incorporated by reference herein.

FIELD OF THE INVENTION

The present invention relates to a high-purity magnesium oxide aggregate which can be used in various additives, electronic materials, raw materials for fluorescent substance, catalyst materials, raw materials for various target materials, raw materials for superconducting thin film substrate, raw materials for tunnel barrier for tunnel magnetoresistive element (TMR element), raw materials for protective film for plasma display panel (PDP), raw materials for crystalline magnesium oxide layer for PDP and others, and which is advantageous in that the magnesium oxide particle aggregate can be kept high purity during the storage, so that the magnesium oxide particle aggregate having high purity can be supplied, and a method for producing the same.

BACKGROUND ART

Magnesium oxide (hereinafter, frequently referred to as "MgO") has conventionally been used in a wide variety of fields, such as refractory, electronic materials and catalysts. For example, in the field of plasma display panel (hereinafter, frequently referred to as "PDP") utilizing an electric discharge phenomenon, specifically, alternating current type (AC type) PDP having a structure in which a transparent electrode is covered with a glass dielectric, for preventing the surface of the dielectric layer from changing in properties due to sputtering by ion bombardment to increase the discharge voltage, a protective film is generally formed on the dielectric layer. In this protective film, an MgO film has conventionally been used. The protective film is required to have a low discharge voltage and excellent resistance to sputtering. By using an MgO film as the protective film, which is an insulator having excellent resistance to sputtering and a large coefficient of secondary electron emission, the discharge starting voltage can be lowered. Thus the MgO film contributes to the increase of the life of PDP.

Conventionally, a ground product of MgO single crystals has been mainly used in the MgO deposition material for PDP. As the performance of PDP is improved, the PDP manufacturers demand a higher level of technique, and further improvement of the deposition material for PDP is desired. For this reason, in the deposition material for PDP, a sintered product obtained by sintering high-purity polycrystalline MgO particles, which can be easily controlled in the amounts of the elements added, is being used instead of the ground product of MgO single crystals. Further, in the electronic materials for applications other than PDP, raw materials for fluorescent substance, catalyst materials, raw materials for various target materials, raw materials for superconducting thin film substrate, raw materials for tunnel barrier for tunnel magnetoresistive element (TMR element) and catalysts, there are increasing demands for high-purity MgO materials.

As a technique for obtaining high-purity magnesium oxide, for example, patent document 1 (Japanese Unexamined Patent Publication No. Sho 61-209911) has a description concerning a method for producing high-purity magnesium oxide. The method described in this patent document is a method for producing magnesium oxide, wherein the method comprises: dissolving a crude raw material containing magnesium in a mineral acid to obtain a crude solution of a mineral acid salt of magnesium; adding an alkali to the crude solution to cause precipitation of impurities contained in the crude raw material and remove the impurities, obtaining a mineral acid salt of magnesium; adding an alkali to the purified solution so that the pH becomes 10 or higher; subjecting the alkali-containing solution to hydrothermal treatment at a temperature of 120° C. or higher to form a magnesium compound consisting of a double salt of magnesium hydroxide and magnesium sulfate; subjecting the magnesium compound to washing with water and dehydration; and subjecting the dehydrated product to heating at a temperature of 1,000° C. or higher.

With respect to the high-purity magnesium oxide, for example, patent document 2 (Japanese Unexamined Patent Publication No. 2004-084017) discloses magnesium oxide powder used as a raw material for producing a magnesium oxide deposition material for use in the formation of a protective film for a dielectric layer of AC type plasma display panel. The characteristic feature of this magnesium oxide powder resides in that the magnesium oxide powder has an MgO purity of higher than 99.98% by mass and a specific surface area in the range of 5 to 10 $m^2/g$, and the primary particles of the powder have a cubic shape. Further, this patent document discloses that the magnesium oxide powder is produced by a gas phase oxidation reaction method in which high-purity metal magnesium vapor and oxygen are reacted with each other in a gas phase.

This magnesium oxide powder is produced by a gas phase oxidation method in which metal magnesium is directly oxidized, and such a method for producing high-purity magnesium oxide by the gas phase method requires cumbersome facilities for production and complicated operations for reaction. Therefore, a purity of 99.99% by mass or higher is difficult to obtain, and the production cost is considered to be increased, and thus magnesium oxide having a satisfactorily high purity has not yet been obtained.

Patent document 3 (Japanese Unexamined Patent Publication No. 2007-91525) discloses magnesium oxide powder which has a small impurity content and can be easily handled and hence has excellent workability, and which is used as a raw material for forming a protective film for a dielectric layer of color plasma display panel, wherein the magnesium oxide powder contains a primary particle of crystalline magnesium oxide and a secondary particle that is an aggregate of a plurality of the primary particles, and wherein the magnesium oxide powder has an average particle size of 0.5 to 10 μm and a BET specific surface area of 0.1 to 3 $m^2/g$. This patent document discloses that the magnesium oxide powder is produced by firing magnesium oxalate having a predetermined average particle size at a predetermined temperature.

In the production of MgO particles, a method of firing magnesium hydroxide can be used. In this method for producing MgO particles, the magnesium hydroxide as a raw material needs to be high purity. Conventionally, magnesium oxide having a relatively high purity has been produced from magnesium hydroxide, however, there has not yet been obtained magnesium hydroxide having such high purity that the amount of each of the metal impurities contained is 10 ppm by mass or less.

As magnesium hydroxide having a higher purity, for example, patent document 4 (Japanese Unexamined Patent Publication No. 2001-302232) discloses high-purity magnesium hydroxide having a purity of 99.98% by mass or higher in terms of MgO, which is obtained by hydrating MgO fine particles consisting of high-purity single crystals of independent primary fine particles. Further, patent document 5 (Japanese Unexamined Patent Publication No. 2002-255544) discloses that a fired MgO product having a controlled content of a specific inorganic compound is hydrated in the presence of a water-soluble magnesium salt under specific conditions to obtain magnesium hydroxide having a purity of 99.5% by mass or higher.

However, the high-purity magnesium hydroxide disclosed in each of the above prior art documents has a purity as low as less than 99.99% by mass, and has not achieved the purity level of 99.99% by mass or higher, which meets the requirements for the magnesium hydroxide used as a raw material for fluorescent substances and others.

On the other hand, with respect to the magnesium oxide usable in the applications of various additives, electronic materials, raw materials for fluorescent substance, catalyst materials, raw materials for crystalline magnesium oxide layer for PDP and others, the magnesium oxide is required to exhibit excellent dispersibility when the particles of magnesium oxide are dispersed in, e.g., water. For achieving excellent dispersibility, techniques for obtaining an aggregate of particles by granulation using spray drying are disclosed. For example, patent document 6 (Japanese Unexamined Patent Publication No. Hei 08-067505) discloses an inorganic oxide particle (a mother particle) that is an aggregate of inorganic oxide fine particles (child particles), which are produced by spray drying of a slurry comprising an inorganic oxide that is dispersed fine particles (child particles) having an average particle size and particle size distribution in a specific range, for obtaining particles having an average particle size of 0.1 to 1.0 μm and having excellent dispersibility in water. Patent document 7 (Japanese Unexamined Patent Publication No. 2001-327849) discloses granules consisting of dispersible, finely divided solid having a primary particle size of less than 10 μm, wherein the each granule have a uniform density distribution and a substantially spherical shape, and wherein the granules are completely redispersible under dispersion conditions used for the starting solid. However, each of the above prior art documents has no descriptions about studies of the production of high-purity magnesium oxide aggregate.

Generally, magnesium oxide fine particles are prepared by grinding magnesium oxide, which is obtained by firing a precursor, by a physical method using, e.g., a mill or a grinder, and supplied in such a ground state. In the conventional high-purity magnesium oxide, magnesium oxide having purity as high as 99.99% cannot be supplied because of impurities mixed into the magnesium oxide at each step of the production. In addition, ground magnesium oxide by using, e.g., a mill or a grinder is likely to suffer agglomeration, and cannot achieve satisfactory fluidity and dispersibility.

Moreover, there is a problem that, after high-purity magnesium oxide was produced, impurities are mixed into the produced high-purity magnesium oxide powder to lower the purity. It is known that impurities are mixed into the magnesium oxide powder in a large amount especially in the grinding step for the magnesium oxide powder. Therefore, after the high-purity magnesium oxide powder was produced, it is necessary that the purity is kept high.

Patent document 1: Japanese Unexamined Patent Publication No. Sho 61-209911
Patent document 2: Japanese Unexamined Patent Publication No. 2004-084017
Patent document 3: Japanese Unexamined Patent Publication No. 2007-91525
Patent document 4: Japanese Unexamined Patent Publication No. 2001-302232
Patent document 5: Japanese Unexamined Patent Publication No. 2002-255544
Patent document 6: Japanese Unexamined Patent Publication No. Hei 08-067505
Patent document 7: Japanese Unexamined Patent Publication No. 2001-327849

DISCLOSURE OF THE INVENTION

Problems to be Solved by the Invention

It is an object of the present invention to provide a high-purity magnesium oxide particle aggregate that is redispersible, and can be supplied with keeping high purity, and a method for producing the same.

Means to Solve the Problems

As examples of impurities usually contained in magnesium oxide, there can be mentioned Si, Al, Ca and Fe, and these impurities are contained in the magnesium oxide in relatively large amounts compared to the other impurity elements. Since the amounts of these impurities contained in the magnesium oxide depend on the type of the raw material source used for magnesium compound, the selections of the raw material sources are important. Therefore, for solving the above problems, the present inventors have conducted experiments of the synthesis of magnesium hydroxide using various materials containing magnesium ions, for synthesizing a starting material for a sintered MgO product, for example. As a result, they have found that, for keeping purity of magnesium oxide using the obtained high-purity magnesium hydroxide, a unique shape of particle aggregate is suitable, and the present invention has been completed.

Specifically, the present invention is directed to a magnesium oxide particle aggregate that is an aggregate of magnesium oxide particles, wherein the magnesium oxide particles have an average particle size of 1 μm or less, and comprise Si, Al, Ca, Fe, V, Cr, Mn, Ni, Zr, B and Zn as impurities in their respective amounts of 10 ppm by mass or less, wherein the total amount ratio of the impurities is 100 ppm by mass or less, preferably 50 ppm by mass or less. It is preferred that the magnesium oxide particle aggregate has a particle size of 10 μm or more. It is preferred that the magnesium oxide particle aggregate has a first mode size and a second mode size larger than the first mode size in the pore distribution measured by mercury intrusion porosimetry, wherein the first mode size is 0.1 to 1 μm and the second mode size is 8 to 20 μm. It is preferred that the magnesium oxide particle aggregate has a substantially spherical shape.

The present invention is also directed to a method for producing a magnesium oxide particle aggregate, wherein the method comprises the steps of: reacting an aqueous alkali solution having an alkali content of 20 to 50% by mass with an aqueous solution that is obtained by mixing magnesium chloride containing Si, Al, Fe, V, Cr, Mn, Ni, Zr, B and Zn in their respective amounts of 10 ppm by mass or less and Ca in an amount of 30 ppm by mass or less and pure water purified to have an electric conductivity of 0.1 μS/cm or less, to form magnesium hydroxide, and subsequently, subjecting the formed magnesium hydroxide to hydrothermal treatment in an autoclave, and then subjecting the magnesium hydroxide to filtration, washing with water, and drying to prepare high-purity magnesium hydroxide particles; firing the high-purity magnesium hydroxide particles to prepare high-purity magnesium oxide particles; and subjecting a slurry having dispersed therein the high-purity magnesium oxide particles to spray drying.

Effect of the Invention

The use of the magnesium oxide particle aggregate of the present invention makes it possible to supply redispersible magnesium oxide with keeping high purity. Further, the magnesium oxide particle aggregate can be produced by the method of the present invention.

BEST MODE FOR CARRYING OUT THE INVENTION

Figure 1:
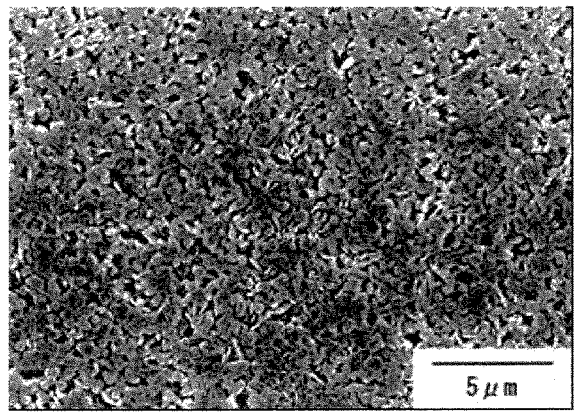
FIG. 1 is a scanning electron microscope (SEM) photomicrograph of the magnesium hydroxide obtained in Raw Material Synthesis Example 1 of the present invention.

A high-purity magnesium oxide particle aggregate of the present invention is a magnesium oxide particle aggregate that is an aggregate of high-purity magnesium oxide particles.

The high-purity magnesium oxide particles comprise Si, Al, Ca, Fe, V, Cr, Mn, Ni, Zr, B and Zn as impurities in their respective amounts of 10 ppm by mass or less, i.e., 0 to 10 ppm by mass. The total amount ratio of the impurities is 100 ppm by mass or less, preferably 50 ppm by mass or less. Therefore, the total amount ratio of the impurities in the magnesium oxide particle aggregate of the present invention is 100 ppm by mass or less, preferably 50 ppm by mass or less. The purity of the magnesium oxide is determined by subtracting the total of the measured amounts of the above 11 types of impurities from 100.0000% by mass. Specifically, the magnesium oxide particle aggregate of the present invention has a purity of 99.99% by mass or higher. The magnesium oxide particles having such high purity can be produced by the method mentioned later.

The average particle size of the high-purity magnesium oxide particles is 1 or less. In the present invention, for improving of prevention of unnecessary impurities from mixing into the magnesium oxide particle aggregate and the redispersibility of the magnesium oxide particles, it is preferred that the magnesium oxide particle aggregate that is an aggregate of the magnesium oxide particles has a particle size of 10 μm or more. With respect to the average particle size of the magnesium oxide particles, a 50% particle size of the particles is measured by a laser diffraction type particle size measurement apparatus (trade name: HIRA, manufactured by NIKKISO CO., LTD.), and this measured value is used as the average particle size. The particle size of the magnesium oxide particle aggregate can be obtained by a measurement by a sieving method.

When the pore distribution of the magnesium oxide particle aggregate of the present invention is measured by mercury intrusion porosimetry, two mode sizes can be obtained. The smaller mode size is referred to as "first mode size", and the larger mode size is referred to as "second mode size". It is presumed that the first mode size corresponds to voids between the magnesium oxide particles and the second mode size corresponds to voids between the magnesium oxide particle aggregates. Therefore, by specifying the first mode size and second mode size, the aggregate structure of the magnesium oxide particle aggregate of the present invention can be defined. The magnesium oxide particle aggregate of the present invention that is an aggregate of magnesium oxide particles has an aggregate structure such that the first mode size is 0.1 to 1 μm and the second mode size is 8 to 20 μm in the pore distribution measured by mercury intrusion porosimetry.

It is preferred that the magnesium oxide particle aggregate has a substantially spherical shape. When the shape of the magnesium oxide particle aggregate is nearly spherical, the surface area of the magnesium oxide particle aggregate is smaller, so that the area of the aggregate to which unnecessary impurities and others attach can be reduced, enabling the aggregate to keep the purity high. Further, the magnesium oxide particle aggregate having such the shape has excellent fluidity and can be easily handled.

The magnesium oxide particle aggregate of the present invention can be produced by the following method.

Magnesium hydroxide powder with Si, Al, Ca, Fe, V, Cr, Mn, Ni, Zr, B and Zn in their respective amounts of 10 ppm by mass or less, wherein the total amount ratio of these impurities is 100 ppm by mass or less is first obtained. For obtaining such magnesium hydroxide powder, the raw material to be used is preliminarily purified, followed by precipitation and separation of magnesium hydroxide.

As a raw material for the magnesium hydroxide powder, a magnesium compound which forms magnesium ions in an aqueous solution, e.g., magnesium chloride is preferably used, and anhydrous magnesium chloride is more preferably used. With respect to the purity of the magnesium chloride, it is necessary that respective amounts of Si, Al, Fe, V, Cr, Mn, Ni, Zr, B and Zn are 10 ppm by mass or less and an amount of Ca is 30 ppm by mass or less. The magnesium compound is not limited to magnesium chloride, and any magnesium compound can be used as long as respective amounts of Si, Al, Fe, V, Cr, Mn, Ni, Zr, B and Zn are 10 ppm by mass or less and an amount of Ca is 30 ppm by mass or less after dissolved in water.

Water is added to the above-mentioned magnesium chloride raw material to form an aqueous solution of magnesium chloride. The amount of the water added is preferably 2 to 5 times of the amount of the anhydrous magnesium chloride. In this instance, as water, ultrapure water which has been ion-exchanged is used. Particularly, since there is a possibility that water contains a significant amount of Si, it is necessary to use ultrapure water purified by passing through an ion-exchange resin to have an electric conductivity of 0.1 μS/cm or less.

Then, for removing unnecessary impurities, such as Si, from the aqueous solution of magnesium chloride by purification, prior to the main reaction using sodium hydroxide, an alkali source is added to the aqueous solution of magnesium chloride in such an amount that the reaction rate for magnesium ions becomes 20 mol % to perform a purification (primary) reaction, obtaining a purified, high-purity $MgCl_2$ solution. In this reaction, 20 mol % of all of the magnesium ions contained in the aqueous solution of magnesium chloride and the impurities precipitated in the form of hydroxide are removed by precipitation, so that the remaining purified aqueous solution of magnesium chloride is increased in purity. Sodium hydroxide is preferred from the viewpoint of the small impurity content, but also aqueous ammonia can be used. It is preferred that sodium hydroxide is an aqueous solution obtained by dissolving an alkali having an alkali content of 20 to 50% by mass in water. In addition, for removing unnecessary impurities, such as Si, contained in the NaOH itself, by purification, before using the sodium hydroxide in the main reaction, the magnesium chloride solution is added to the aqueous solution of sodium hydroxide in such an amount that the reaction rate for hydroxide ions becomes 10 mol % to perform a pre-reaction, increasing the purity of the sodium hydroxide. In this reaction, 10 mol % of the hydroxide ions contained in the aqueous solution of sodium hydroxide are reacted with magnesium ions to form magnesium hydroxide, and the magnesium hydroxide is precipitated, together with the unnecessary impurities, and they are together removed, so that the remaining aqueous solution of sodium hydroxide is reduced in the amount of impurities.

Subsequently, a secondary reaction of the above-obtained purified $MgCl_2$ solution and an alkali source, such as NaOH, is conducted to obtain magnesium hydroxide slurry. Then, the obtained magnesium hydroxide slurry is subjected to hydrothermal treatment (temperature: 100 to 150° C.; time: 0 to 60 minutes) in an autoclave so that the resultant particles are crystals having a 50% particle size of 1 μm or less and a specific surface area of 8 to 30 $m^2/g$, therefore, magnesium hydroxide to be used as a raw material for the magnesium oxide particle aggregate of the present invention can be obtained. It is presumed that the treatment using an autoclave can make the crystal grains of magnesium hydroxide uniform and cause the unnecessary impurities incorporated to the crystals to be dissolved in the solution, making it possible to reduce the amount of the impurities contained in the magnesium hydroxide.

The above-obtained high-purity magnesium hydroxide particles are then fired to obtain high-purity magnesium oxide powder. The raw material magnesium hydroxide obtained by the above-described method has high purity and excellent dispersibility, therefore no abnormal grain growth occurs during the firing of magnesium hydroxide, making it possible to obtain magnesium oxide powder having excellent dispersibility.

The fired magnesium oxide powder is dispersed in a denatured alcohol solvent having nylon balls with iron core by means of a wet pot mill for 2 to 20 hours, preferably for 5 to 10 hours, to obtain magnesium oxide slurry. As the nylon balls, for example, nylon balls with diameter of about 15 mm can be used. The obtained magnesium oxide slurry is subjected to spray drying for granulation to produce the magnesium oxide particle aggregate of the present invention. The spray drying can be performed using, e.g., a rotating disc type or pressure nozzle type apparatus at a temperature of about 100 to several hundred ° C. It is preferred that the spray drying is performed using a spray dryer.

The characteristic feature of the magnesium oxide particle aggregate of the present invention resides in that it can be produced using the magnesium hydroxide obtained by the above-described method. When the magnesium oxide is produced using magnesium hydroxide obtained by a general liquid phase reaction, a problem arises in that the magnesium hydroxide is in a state of aggregate of fine particles to cause the filtering characteristics and the efficiency of washing with water in the production of the magnesium oxide to be poor, thus lowering the productivity and increasing the impurity content of the magnesium oxide. Further, the magnesium hydroxide obtained by a general liquid phase reaction is large in the aggregate of particles, and such magnesium hydroxide having a small BET specific surface area is likely to suffer abnormal grain growth during the firing, disadvantageously forming coarse particles of magnesium oxide. The magnesium hydroxide obtained by the above-described method solves the problems of abnormal grain growth. The magnesium oxide particle aggregate of the present invention is easily dispersed into primary particles in various solvents, such as water or an organic solvent, and can be advantageously used in the applications which require high dispersibility, such as various additives, electronic materials, raw materials for fluorescent substance, catalyst materials, raw materials for superconducting thin film substrate and raw materials for crystalline magnesium oxide layer for PDP. Further, the magnesium oxide particle aggregate can also be directly shaped and sintered and then advantageously used as a raw material for various target materials, a raw material for tunnel barrier for TMR element and a raw material for protective film for PDP.

EXAMPLES

Hereinbelow, the present invention will be described in more detail with reference to the following Examples.
(Measurement of Physical Properties)
The physical properties of magnesium hydroxide [$Mg(OH)_2$] powder and magnesium oxide (MgO) powder were measured by the following methods.
(1) Measurement of Impurity Content of $Mg(OH)_2$ and MgO
The trace impurities measured are 11 elements in total, i.e., Si, Al, Ca, Fe, V, Cr, Mn, Ni, Zr, B and Zn, and a sample was dissolved in an acid and then subjected to measurement of the content of each element using an ICP optical emission spectrometry analyzer (trade name: SPS-1700VR, manufactured by Seiko Instruments Inc.). The purity of $Mg(OH)_2$ was determined by subtracting the total of the measured amounts of the above 11 types of impurities from 100.0000% by mass. The total amount of the impurities corresponds to the total of the amounts of the 11 types of impurities.
(2) Particle Size Distribution
With respect to the particle size distribution of powder, a 10% particle size, a 50% particle size, and a 90% particle size were measured using a laser diffraction type particle size measurement apparatus (trade name: HIRA, manufactured by NIKKISO CO., LTD.).
(3) BET Specific Surface Area
A specific surface area was measured by a gas adsorption method using a specific surface area measurement apparatus (trade name: Macsorb 1210, manufactured by Mountech Co., Ltd.).
(4) Pore Distribution
A pore distribution was measured using a pore distribution measurement apparatus by mercury intrusion porosimetry (trade name: AutoPore 9410, manufactured by Micromeritics Instrument Corporation).
(5) Fluidity
A degree of aggregation and a fluidity index of powder were measured using a powder characteristic measurement apparatus (trade name: POWDER TESTER PT-N, manufactured by Hosokawa Micron Corporation). The fluidity index is a so-called Carr's fluidity index proposed by R. L. Carr and used as an index for generally evaluating the fluidity of powder. Specifically, the fluidity index is a value obtained by individually measuring an angle of repose, compressibility, an angle of spatula and a degree of aggregation, and determining indices of the individual measurements using the Can's conversion chart and calculating the total of the determined indices.

Preparation of Magnesium Hydroxide and Magnesium Oxide Particles

Raw Material Synthesis Example 1

1.0 kg of magnesium chloride ($MgCl_2$) (content of each of the elements as impurities measured by analysis: each of Si, Al, Fe, V, Cr, Mn, Ni, Zr, B and Zn: 10 ppm by mass or less; Ca: 30 ppm by mass or less) was dissolved in ion-exchanged water (pure water having an electric conductivity of 0.1 µS/cm or less), and the volume of the resultant solution was adjusted to 3 litters ($MgCl_2$=about 3.5 mol/l). The $MgCl_2$ solution and a NaOH solution (alkali content: 20 to 50% by mass) were individually fed to a reactor using a fixed displacement pump and a roller pump so that the reaction rate for $MgCl_2$ became 20 mol % to perform a continuous reaction. The resultant reaction slurry was overflowed from the reactor with a residence time of 30 minutes, and an agglomerating agent was added in an amount of 500 ppm by mass, based on the mass of the formed magnesium hydroxide, to cause precipitation, and the supernatant (purified magnesium chloride solution) was collected.

Figure 2:
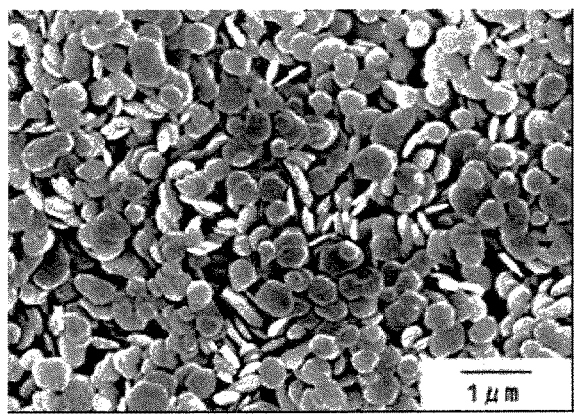
FIG. 2 is a SEM photomicrograph of the magnesium hydroxide obtained in Raw Material Synthesis Example 1 of the present invention.

While stirring the purified magnesium chloride solution that was collected, a NaOH solution (alkali content: 20 to 50% by mass) was added thereto so that the reaction rate for $MgCl_2$ became 90 mol %, followed by stirring for 30 minutes. The resultant magnesium hydroxide slurry was subjected to hydrothermal treatment in an autoclave at 130° C. for one hour. The hydrothermal-treated magnesium hydroxide slurry was subjected to filtration, washing with water, and drying to obtain magnesium hydroxide powder. Scanning electron microscope (SEM) photomicrographs of the obtained magnesium hydroxide are shown in FIGS. 1 and 2, and the results of measurements of the chemical compositions and physical properties of the magnesium hydroxide are shown in Table 1.

Comparative Raw Material Synthesis Example 1

1.0 kg of commercially available magnesium oxide (high-purity magnesium oxide fine powder produced by a gas phase method) was added to 30 litters of warm water maintained at 60° C., and stirred for 4 hours for hydrating the magnesium oxide fine powder, and magnesium hydroxide slurry was obtained. Then, the obtained magnesium hydroxide slurry was subjected to filtration, dehydration, and drying to obtain a magnesium hydroxide solid material, and then the solid material was ground using a grinder to prepare magnesium hydroxide powder. The results of measurements of the chemical compositions and physical properties of the obtained magnesium hydroxide are shown in Table 1.

Comparative Raw Material Synthesis Example 2

Commercially available magnesia clinker (seawater high-purity magnesium clinker) was ground, and 1.0 kg of the resultant magnesium oxide particulate material was added to 10 litters of a 0.25 mol/l aqueous solution of magnesium acetate, and reacted in an autoclave at 130° C. for 2 hours with stirring, and then the resultant product was subjected to washing with water, filtration, and drying to prepare magnesium hydroxide powder. The results of measurements of the chemical compositions and physical properties of the obtained magnesium hydroxide are shown in Table 1.

As can be seen from Table 1, the method in Raw Material Synthesis Example 1 could prepare magnesium hydroxide having a high purity, compared to the methods in Comparative Raw Material Synthesis Examples 1 and 2. Accordingly, it is apparent that, for obtaining the magnesium oxide particle aggregate of the present invention, the magnesium hydroxide obtained by the method in Raw Material Synthesis Example 1 is preferably used.

TABLE 1

|  | Raw Material Synthesis Example 1 | Comparative Raw Material Synthesis Example 1 | Comparative Raw Material Synthesis Example 2 |
|---|---|---|---|
| $Mg(OH)_2$ (%) | 99.9991 | 99.9926 | 99.9600 |
| Si (ppm by mass) | 3 | 6 | 100 |
| Al (ppm by mass) | <1 | 3 | 90 |
| Ca (ppm by mass) | 1 | 10 | 50 |
| Fe (ppm by mass) | 1 | 5 | 90 |
| V (ppm by mass) | <1 | <1 | <1 |
| Cr (ppm by mass) | <1 | 2 | 6 |
| Mn (ppm by mass) | <1 | 10 | 9 |
| Ni (ppm by mass) | <1 | 1 | 30 |
| Zr (ppm by mass) | 3 | <1 | 3 |
| B (ppm by mass) | 1 | <1 | 20 |
| Zn (ppm by mass) | <1 | 37 | 2 |
| Total amount of impurities (ppm by mass) | <15 | <77 | <401 |
| BET Specific surface area ($m^2/g$) | 13.6 | 17.3 | 10.4 |
| 50% Particle size D50 (µm) | 0.38 | 1.26 | 1.73 |

Example 1

The magnesium hydroxide obtained in Raw Material Synthesis Example 1 was fired in a shuttle kiln at 1,400° C. for 60 minutes to obtain magnesium oxide in a bulk form. The obtained magnesium oxide was dispersed in a denatured alcohol solvent having nylon balls (about 15 mm in diameter) with iron core by means of a wet pot mill for 8 hours. Then, the resultant dispersion was subjected to spray drying using a spray dryer (trade name: COC-20, manufactured by OHKAWARA KAKOHKI CO., LTD.) under conditions such that the drying temperature was 140° C. and the rotation speed of the atomizer was 10,000 rpm for aggregating the particles, and a magnesium oxide particle aggregate was obtained.

Comparative Example 1

Commercially available magnesium oxide powder (magnesium oxide fine powder produced by a gas phase method) was used as magnesium oxide in Comparative Example 1.

Comparative Example 2

The fired magnesium oxide in Example 1 was not subjected to dispersion and spray drying, and it was merely ground using a grinder (trade name: Power Mill, manufactured by DALTON CO., LTD.), and used as magnesium oxide in Comparative Example 2.

Figure 5:
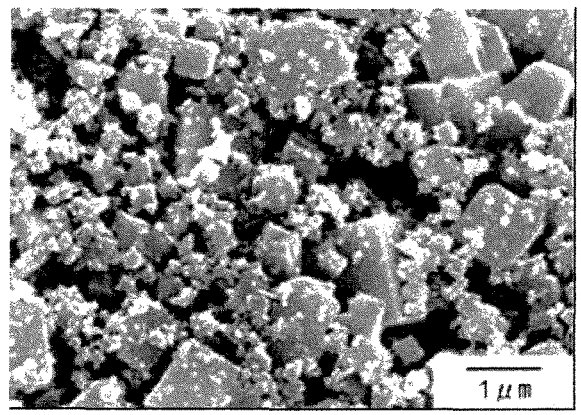
FIG. 5 is a SEM photomicrograph of the magnesium oxide in Comparative Example 1.
Figure 6:
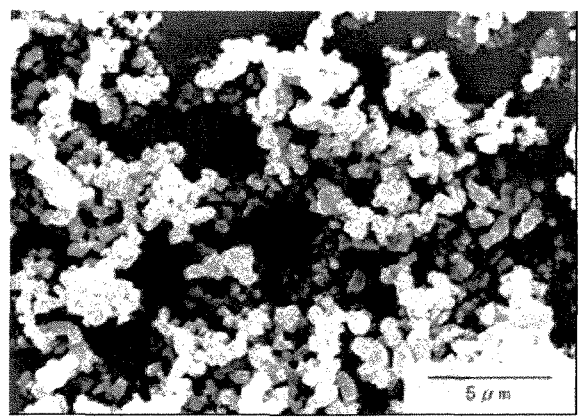
FIG. 6 is a SEM photomicrograph of the magnesium oxide obtained in Comparative Example 2.

With respect to the magnesium oxide in Example 1 and Comparative Examples 1 and 2, the chemical compositions, physical properties, pore distribution by mercury intrusion porosimetry (first mode size and second mode size) and fluidity (degree of aggregation and fluidity index) were measured. The results of the measurements are shown in Table 2. In the measurement of particle size distribution in Example 1, particle size distribution was measured after the aggregate were dispersed into particles. SEM photomicrographs of the magnesium oxide particle aggregate obtained in Example 1 of the present invention and magnesium oxide particles constituting the magnesium oxide particle aggregate are shown in FIGS. 3 and 4, a SEM photomicrograph of the magnesium oxide in Comparative Example 1 is shown in FIG. 5, and a SEM photomicrograph of the magnesium oxide obtained in Comparative Example 2 is shown in FIG. 6.

TABLE 2

|  | Example 1 (Spray drying) | Comparative Example 1 (No spray drying) | Comparative Example 1 (No spray drying) |
|---|---|---|---|
| Si (ppm by mass) | 1 | 6 | 2 |
| Al (ppm by mass) | <1 | 2 | 1 |
| Ca (ppm by mass) | 3 | 5 | 3 |
| Fe (ppm by mass) | 2 | 4 | 11 |
| V (ppm by mass) | <1 | <1 | 3 |
| Cr (ppm by mass) | <1 | <1 | 3 |
| Mn (ppm by mass) | <1 | 8 | 6 |
| Ni (ppm by mass) | <1 | <1 | 2 |
| Zr (ppm by mass) | 9 | <1 | 12 |
| B (ppm by mass) | <1 | <1 | 1 |
| Zn (ppm by mass) | <1 | 34 | 1 |
| Total amount of impurities (ppm by mass) | <22 | <64 | <55 |
| Shape of particle | Spherical (Aggregate shape) | Amorphous, agglomerate | Amorphous, agglomerate |
| First mode size (µm) | 0.21 | 0.20 | 0.37 |
| Second mode size (µm) | 13.87 | None | None |
| Degree of aggregation (%) | 4 | 60.4 | 63.7 |
| Fluidity index | 63 | 32.5 | 34.5 |
| 10% Particle size D10 (µm) | 0.23 | 0.37 | 0.34 |
| 50% Particle size D50 (µm) | 0.40 | 1.04 | 1.09 |
| 90% Particle size D90 (µm) | 0.88 | 2.52 | 2.61 |
| D90/D10 | 3.8 | 6.8 | 7.7 |

Figure 3:
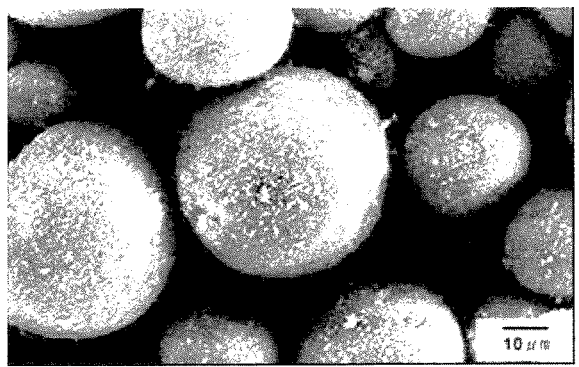
FIG. 3 is a SEM photomicrograph of the magnesium oxide particle aggregate obtained in Example 1 of the present invention.
Figure 4:
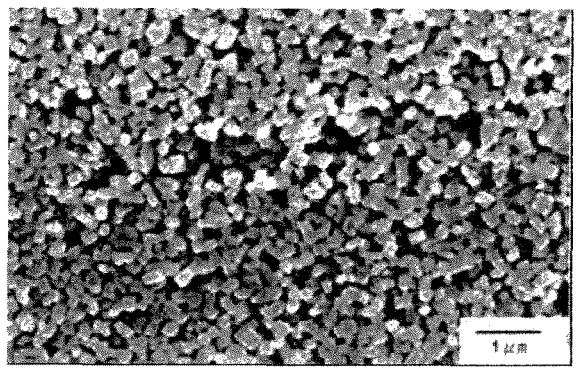
FIG. 4 is a SEM photomicrograph of the magnesium oxide particles constituting the magnesium oxide particle aggregate obtained in Example 1 of the present invention.

As seen in FIGS. 3 and 4, in Example 1, the magnesium oxide particle aggregate having a predetermined shape could be obtained by the above-described method. As can be seen from the results shown in Table 2, the magnesium oxide particle aggregate obtained in Example 1 was improved in fluidity and dispersibility, compared to the magnesium oxide powder in Comparative Examples 1 and 2. The smaller the ratio of the 90% particle size to the 10% particle size, i.e., D90/D10, the more excellent the dispersibility (or the narrower the particle size distribution).

Taking into consideration the measurement performance of the pore distribution measurement apparatus by mercury intrusion porosimetry, the magnesium oxide particle size and the particle size of the magnesium oxide particle aggregate, from the results shown in Table 2, it is apparent that, when the first mode size and the second mode size are 0.1 to 1 µm and 8 to 20 µm, respectively, a magnesium oxide particle aggregate having the effect by the present invention can be obtained.

Further, as can be seen from Table 2, the magnesium oxide particle aggregate obtained in Example 1 contains the impurities in their respective amounts of 10 ppm or less, and the high purity can be kept, compared to the magnesium oxide powder in Comparative Examples 1 and 2. Taking the error of measurement for the impurities and others into consideration, the total amount of the impurities contained in the magnesium oxide particle aggregate can be reduced to a value in the same order as the value in Example 1, specifically, 100 ppm by mass or less, preferably 50 ppm by mass or less. The mechanism of this effect is not clear, but it is presumed that, by having the particle aggregate structure, the magnesium oxide can avoid pollution from the outside.

The invention claimed is:

1. A magnesium oxide particle aggregate consisting of: magnesium oxide particles±each of the magnesium oxide particles consisting essentially of magnesium oxide,
    wherein the magnesium oxide particles have an average particle size of 1 micron or less, and have Si, Al, Ca, Fe, V, Cr, Mn, Ni, Zr, B and Zn as impurities in their respective amounts of 10 ppm by mass or less; wherein the total amount ratio of the impurities is 100 ppm by mass or less; the magnesium oxide particle aggregate has a particle size of 10 microns or more;
    the magnesium oxide particle aggregate has a spherical shape;
    and the magnesium oxide particle aggregate has a first mode size and a second mode size larger than the first mode size in the pore distribution measured by mercury intrusion porosimetry, wherein the first mode size is 0.1 to 1 micron and the second mode size is 8 to 20 microns.

* * * * *